Patented June 23, 1942

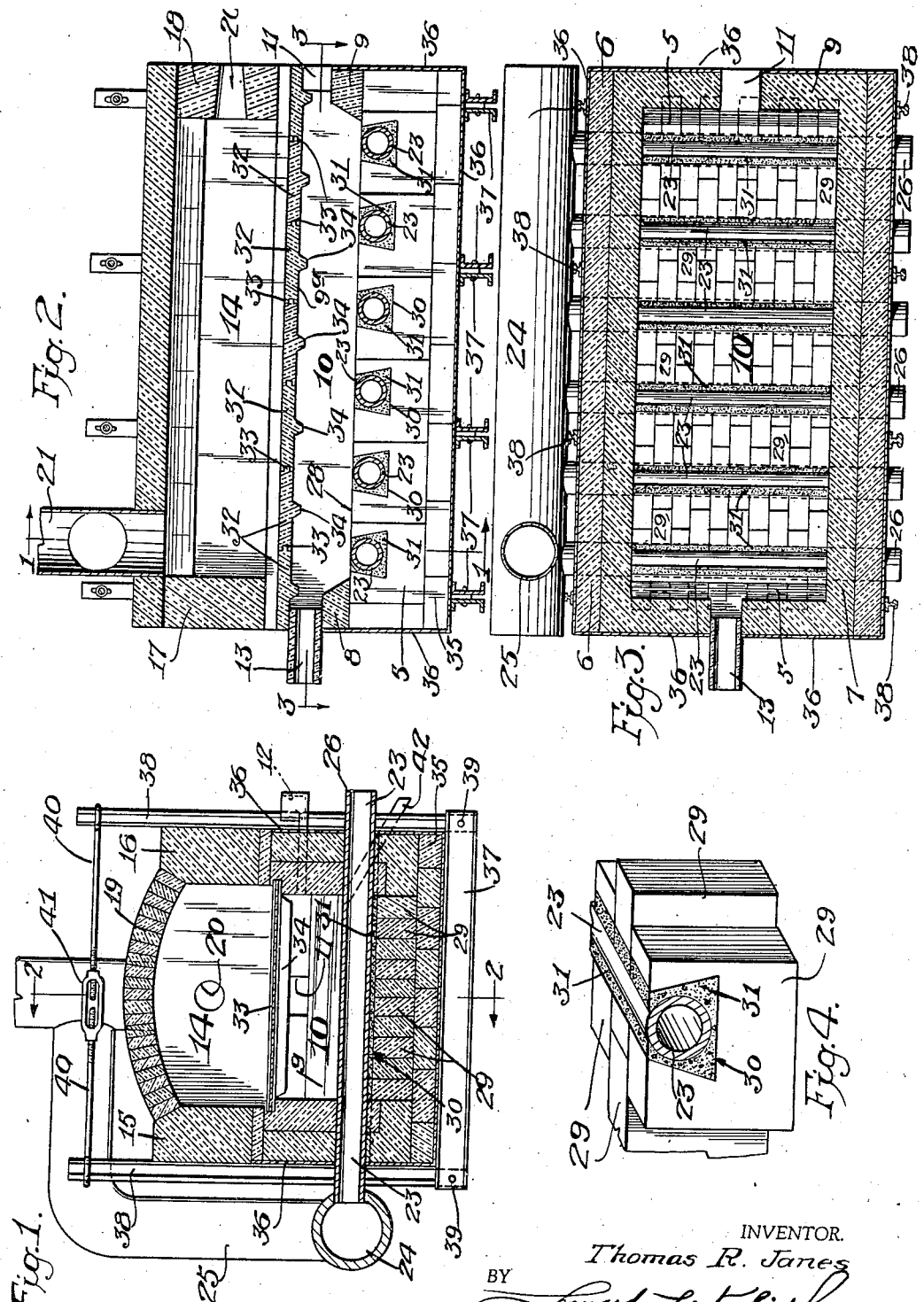

2,287,038

UNITED STATES PATENT OFFICE 2,287,038

METAL RECOVERY AND REFINING FURNACE

Thomas R. Janes, Langhorne, Pa., assignor to Superior Zinc Corporation, Bristol, Pa., a corporation of Pennsylvania Application October 11, 1939, Serial No. 299,007

10 Claims. (Cl. 266—24)

The present invention relates to smelting and refining furnaces for metals and ores thereof, and it relates more particularly to smelting and refining furnaces for metals which may be recovered or refined by vaporization or distillation, and it relates more particularly to a furnace for recovering and refining zinc and other metals having relatively low boiling points.

One of the objects of the present invention is to improve the smelting of zinc ores, as well as the recovery and purification of zinc from secondary sources such as zinc skimmings, zinc alloys and other zinc-bearing or zinciferrous materials.

A further object of the present invention is to permit a greater and more ready separation of the several metals which may be present, that is, to permit the greater and more ready elimination of cadmium and lead from the zinc, thereby to recover and purify zinc more nearly free of cadmium, lead and other metals.

A further object of the present invention is generally to increase the efficiency of the smelting, recovery and refining of zinc and other metals.

One of the common and most widely used methods of smelting zinciferrous material is to use multiple retort furnaces in which such material is then heated.

Such furnaces are operated by skilled workmen and produce satisfactory results but are expensive to construct and maintain. Labor is arduous and losses are heavy. Each retort is a separate unit, delivering but a small amount of vapor and condensation is not uniform because of the difficulty of regulating numerous condensers. Also heating cannot be uniform and hence both efficiency and recovery usually suffer.

Various attempts have been made to enlarge the size of retorts but these have been unsuccessful due to limitations of refractories.

In smelting zinciferrous materials, it is necessary to heat the zinc-bearing material with reducing material which causes reduction of the zinc to metallic vapor. This also produces an equivalent amount of carbon monoxide and some carbon dioxide. Carbon dioxide is undesirable since it tends to reoxidize some of the zinc vapor and interferes with condensation of the vapor in metallic state. Prevention of formation of carbon dioxide in the smelting zone and in the condensation zone is the most helpful step towards efficient operation of a smelting unit. A relatively gas-tight retort is essential for smelting zinc products. Furthermore, control of temperature is essential for efficient smelting.

I have invented certain new and useful improvements whereby it is possible to construct a large retort through use of sectional structural materials, and certain principles and features of construction. Such a large retort is an improvement over a multiple retort furnace in many respects. It eliminates much of the labor of charging. It makes possible much better control of temperature. It also permits sending a large volume of zinc vapor into one condenser where improved control over temperature results in higher recovery of zinc vapor as metal and higher over-all efficiency of operation than that of multiple retort furnaces.

For the purpose of illustrating the invention, there is shown in the accompanying drawing a form thereof which is at present preferred, since it has been found in practice to give satisfactory results, although it is to be understood that the various instrumentalities of which the invention consists can be variously arranged and organized and that the invention is not limited to the precise arrangement and organization of the instrumentalities as herein shown and described.

Referring to the drawing in which like reference characters indicate like parts, Figure 1 represents a transverse, vertical, cross-sectional view, generally on line 1—1 of Figure 2, of a furnace embodying the present invention, shown more or less schematically, with the elimination of those details of construction which are merely conventional means generally known and used in the art.

Figure 2 represents a longitudinally, vertical cross-sectional view, generally on line 2—2 of Figure 1.

Figure 3 represents a horizontal cross-sectional view, generally on line 3—3 of Figure 2.

Figure 4 represents a fragmentary perspective view of the lower smelting surface of the furnace embodying the present invention.

The smelting furnace of the present invention includes a bottom designated generally by the numeral 5, side walls 6 and 7, end walls 8 and 9, which together form a shallow receptacle-like chamber having substantial horizontal dimensions, which is covered by an upper heating roof 9a which together with the bottom and sides and end walls forms a generally closed and substantially gas-tight smelting chamber 10 having only one or more charging openings such as the end charging opening 11 and the side charging trough 12 and having a discharge opening 13 at the other end thereof through which the metallic vapors are discharged into condensers (not shown).

Above the heating roof 9a, a combustion chamber 14 is disposed having side walls 15 and 16, end walls 17 and 18 and an arched heat-reflector roof 19 for reflecting the heat or concentrating the heat onto the heating roof 9a which also constitutes the bottom of the combustion chamber 14.

One or more inlet openings 20 are preferably provided in one of the end walls (or in one of the side walls) of the combustion chamber 14, through which the fuel and air may be injected under pressure or sprayed into the combustion chamber, as for instance, by any suitable oil burner or other fuel burner or injector. A stack 21 through the roof 19 at the opposite end of the combustion chamber 14 serves to conduct or carry away the products of combustion.

In the bottom 5 of the furnace, a series of heating tubes 23 are provided of suitable refractory material such as silicon carbide or graphite or other refractory ceramic materials, said heating tubes 13 extending horizontally across and through the furnace in the manner indicated generally in Figure 1 and having their ends at one side of the furnace all terminating in a stack manifold pipe 24 having a stack pipe 25 extending to the common stack 21 through which the products of combustion can be carried away. The opposite ends 26 of the heating tubes 23 are adapted to receive fuel injectors similar to that indicated for the opening 20 of the upper combustion chamber 14, but of smaller size or capacity commensurate with the size of the combustion chamber constituted by the interior of the heating tube.

The heating tubes 23 are preferably arranged with their uppermost portions more or less flush with the horizontal bottom surfaces 28 of the smelting chamber 10, so as to more directly transmit the heat into the molten mass of metal in said chamber when it is desired to apply the heat through the tubes 23.

The bottom 5 of the furnace is preferably formed of a series of staggered refractory-like blocks 29 of suitable size having inwardly enlarged recesses 30 in the upper portions thereof as indicated in Figure 4, the location of said recesses being off center so that by staggering the ultimate blocks the recesses can be brought into alignment in a manner generally indicated in Figures 3 and 4. The distance across the opening or mouth of the recess is preferably slightly greater than the outer diameter of the tube 23, so that the tube can be inserted therein. The clearance between the tube 23 and the recess 30 is then filled with suitable refractory cement or aggregate 31 which is then permitted to set or harden, in situ, so as firmly to set the tube 23 in the blocks 29 and also to form a firm heat-conducting contact around the entire outer surface of the heating tube 23.

The heating roof 9a is formed of flat slabs 32 of suitable refractory material such as carborundum or ceramic refractories;—the adjoining edges being tongued and grooved as at 33 to form a gas-tight juncture. Each slab is provided with a reinforcing rib 34.

Beneath the bottom formed of the blocks 29, a further base 35 may be formed of suitable fire brick or refractory brick.

The lower portion of the furnace including the chamber 10 or the entire furnace, if desired, may be encased in a sheet metal outer sheathing 36 to give support to the furnace and also to make it more nearly gas-tight. The entire furnace may further be supported on pairs of channel irons 37, to the outer ends of which vertical buckstays 38 are secured as at 39, to give lateral support to the furnace, particularly the lateral walls including the walls 15 and 16 thereof and the fire brick arch 19;—these buckstays being in turn fastened at their upper ends by adjustable stay rods or tie rods 40 provided with suitable turn buckles 41 for adjusting the tension.

Between the blocks 29 and in the juncture of all refractory bricks and slabs constituting the chamber 10, high temperature cement is provided for filling and sealing the joints or junctures.

A drain tap 42 may also be provided for drawing out all the molten metal when it is desired to shut down the furnace.

The molten metal may be fed in through the charging trough 12 from time to time, or more or less continuously, so as to maintain the level of the molten metal to a suitable point which is generally below the lowermost point of the discharge pipe 13. The metal is melted in any suitable melting pot preferably at a point somewhat higher than the charging trough 12 so as to permit the molten metal to be charged into and through the trough 12 by gravity.

In the operation of the furnace, the furnace is first heated to a suitable temperature by combustion of fuel in the combustion chamber 14 and, if desired, also by the combustion fuel in the heating tubes 23. Thereafter, the molten metal is fed in through the trough 12 at a suitable level and the molten metal heated gradually to vaporize the several component parts thereof.

If desired, cold metal and solid metal pieces or zinc bearing solid masses may be initially fed into the chamber 10 through the charging opening 11 either while the furnace is comparatively cold or after it has been heated thereby constituting an initial charge for the furnace. Thereafter, the opening 11 is preferably closed up with a fire brick or other suitable closure and after the initial charge of solid material has been molten, the level of the molten metal can be maintained by charging further molten metal into the trough 12.

By applying or withholding heat at the bottom (that is, through the heating tubes 23), the fractional distillation of the component parts of zinc bearing materials may be more efficiently effected.

Thus, by applying bottom heat of sufficient extent, there will be an ebullition in the mass of molten metal with the result that the cadmium content of the molten metal will be vaporized more quickly and will be driven off from the molten metal as a vapor in greater proportion than what would be the case if the heat were merely applied from the top. Thus, by applying heat of sufficient magnitude at the bottom (while also heating from the top) the first vapors which come off are more concentrated in cadmium vapor.

Thereafter, the bottom heat is shut off or considerably reduced and the molten mass heated entirely from above through the heating roof 9a. Further vaporization of the molten mass takes place and the vapor thus driven off will contain less cadmium than the initial vapor first above described, and by so heating only from above, the zinc is then vaporized thereby leaving behind the lead content of the initial molten mass. In this manner, the lead may be concentrated in the molten mass. As the concentration of the lead gradually increases, its solubility in the zinc increases or passes the point of maximum solubility of the lead in the zinc, so that the lead will further be concentrated at the bottom. If desired, the molten metal containing the higher lead concentration may be drawn off from the furnace periodically through the trough block 42 and then the operation is continued by the further addition of molten zinc bearing metals through the charging trough 12 or by the addition of solid zinc bearing metals through the charging opening 11.

Vapors discharged through the outlet tube 13 are conveyed to condensers where the vapors are condensed to metallic zinc;—with the first condensates more rich in cadmium as hereinabove indicated.

By the foregoing means, the vapors drawn off after the initial removal of cadmium as hereinabove indicated will be substantially pure zinc free of cadmium or other impurities.

By this means, zinc ores and zinc skimmings may be smelted and refined efficiently to produce a substantial pure metallic zinc.

Instead of burning fuel such as oil, gas or powder coal in the heating tubes 23, electrical heating units may be disposed within the heating tubes, such as electric glow bars. Likewise, the upper heat may be obtained by similar electric heating units disposed directly beneath the roof 9a of the chamber 10, which may be used entirely to replace the upper heating chamber 14 or may be used to augment the same for more ready temperature control.

Thus, it will be seen that by alternately applying and withholding heat at the bottom for suitable periods, first the cadmium may be separated from the zinc by vaporization and then the lead content and the copper content of the zinc-bearing material may be held back and concentrated while the zinc is being driven off, in the form of metallic zinc vapor.

When using heating tubes similar to the heating tubes 23 for upper heat, these tubes can either be incorporated in the roof in a manner similar to that shown in the bottom or they can replace the roof 9a entirely.

When using electrical heat instead of heat of combustion, the flue or stacks can be eliminated. Thus, if electric heat is used in the heating tubes 23, the manifold 24 and pipe 25 are eliminated and the tubes 23 are plugged at both ends by refractory, so as to retain the heat and indeed are shortened so as not to extend substantially beyond the width of the metal-vaporizing chamber 10 (the electrical conductors extending through the furnace wall to the opposite ends of the tubes 23).

It is to be understood that the zinc vapor discharged through the discharge 13 may also be converted into zinc oxide and any other zinc products which can be made from zinc vapor.

By imbedding the heating tubes 23 in the manner indicated particularly in Figures 2, 3 and 4, the tendency of the tubes to float in the comparatively heavier molten metal is overcome and the tubes maintained firmly in place.

The blocks 29 are preferably of a fire clay tile having relatively poor or relatively low heat conducting capacity, while the tubes 23 are preferably silicon carbide or carborundum or graphite having somewhat greater heating conducting capacity so as to promote the flow of the heat from the tubes upwardly into the bath of molten metal. So, too, the cement or aggregate filling 31 may contain carborundum or other refractory having greater heat conducting capacity.

It will also be seen that in the furnace hereinabove described both air and products of combustion are excluded from contact or commingling with either the molten mass of metal or the metal vapors. The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described the invention, what is hereby claimed as new and desired to be secured by Letters Patent is:

1. A metal-vaporizing furnace including a plurality of heating tubes embedded in the bottom of said metal-vaporizing chamber, with small uppermost parts of the walls of said tubes constituting a portion of the bottom of said metal-vaporizing chamber.

2. A furnace including a material-processing chamber formed of refractory materials of relatively low heat conductivity and heating tubes in the bottom of said chamber formed of refractories of relatively higher conductivity, with small uppermost parts of said tubes constituting portions of the bottom of said chamber.

3. A metal-vaporizing furnace comprising a substantially rectangular metal-vaporizing chamber, means for applying indirect heat from above, a plurality of transverse heating tubes disposed beneath said chamber and having small uppermost portions thereof constituting portions of the bottom of said chamber, and means for independently controlling the supply of fuel to each of said tubes whereby the several tubes may be used, independently of each other and independently of the upper heating means, for applying indirect heat to said chamber from below.

4. In a metal-vaporizing furnace, means for accurately applying indirect heat to the chamber containing the molten material, said heating means comprising a plurality of tubes partially embedded in the floor of said chamber and having small uppermost portions thereof forming part of the bottom of said chamber; each of said tubes being provided with a separate and individually-controllable fuel-injector whereby the several tubes may be used independently of each other for transmitting heat to the molten material.

5. A metal-vaporizing furnace comprising a rectangular shallow metal-vaporizing chamber, a flat heating roof above said chamber and forming the upper wall thereof, said heating roof being formed of adjacent refractory slabs extending across the smaller horizontal dimension of said furnace with their opposite ends supported only by the longitudinal walls of said metal-vaporizing chamber, the juncture between adjacent refractory slabs being generally sealed against passage of vapor therethrough, means for applying heat to the top of said chamber, and a plurality of heating tubes partially embedded in the bottom of said metal-vaporizing chamber with small uppermost parts of said tubes constituting a portion of the bottom of said metal-vaporizing chamber.

6. A metal-vaporizing furnace comprising a rectangular shallow metal-vaporizing chamber, a flat heating roof above said chamber and forming the upper wall thereof, said heating roof being formed of adjacent refractory slabs extending across the smaller horizontal dimension of said furnace with their opposite ends supported only by the longitudinal walls of said metal-vaporizing chamber, the juncture between adjacent refractory slabs being generally sealed against passage of vapor therethrough, means for applying heat to the top of said chamber, and a plurality of heating tubes partially embedded in the bottom of said metal-vaporizing chamber with small uppermost parts of said tubes constituting a portion of the bottom of said metal-vaporizing chamber; each of said heating tubes being provided with an individual fuel-injector whereby the several tubes may be used, independently of each other and independently of the upper heating means, for applying indirect heat to said chamber from below.

7. A metal-vaporizing furnace including an oblong shallow metal-vaporizing chamber having a substantially uniform vertical dimension throughout, a flat heating roof above said chamber and forming the upper wall thereof, said heating roof being formed of adjacent refractory slabs extending across the smaller horizontal dimension of said chamber, with their opposite ends supported by the longitudinal walls of said chamber, a flat heating floor forming the bottom of said chamber, a plurality of heating tubes embedded in said floor, means for applying heat to the top of said chamber, and means for heating said tubes independently of each other; said last-mentioned heating means including a separate fuel-injector operatively connected with each of said tubes.

8. A metal-vaporizing furnace including an oblong shallow metal-vaporizing chamber having a substantially uniform vertical dimension throughout, a flat heating roof above said chamber and forming the upper wall thereof, said heating roof being formed of adjacent refractory slabs extending across the smaller horizontal dimension of said chamber, with their opposite ends supported by the longitudinal walls of said chamber, a flat heating floor forming the bottom of said chamber, a plurality of heating tubes embedded in said floor and extending across the smaller horizontal dimension of said chamber, means for heating said chamber from above, and means for applying heat individually to each of said heating tubes whereby said heating tubes can be used independently of each other for heating said chamber.

9. A metal-vaporizing furnace including an oblong shallow metal-vaporizing chamber having a substantially uniform vertical dimension throughout, a flat heating roof above said chamber and forming the upper wall thereof, said heating roof being formed of adjacent refractory slabs extending across the smaller horizontal dimension of said chamber, with their opposite ends supported by the longitudinal walls of said chamber, a flat heating floor forming the bottom of said chamber, a plurality of heating tubes embedded in said floor, means for applying indirect heat to said chamber from above, and a separate and individually-controllable fuel burner operatively connected with each of said heating tubes.

10. A metal-varopizing furnace including an oblong shallow metal-vaporizing chamber having a substantially uniform vertical dimension throughout, a flat heating roof above said chamber and forming the upper wall thereof, said heating roof being formed of adjacent refractory slabs extending across the smaller horizontal dimension of said chamber, with their opposite ends supported by the longitudinal walls of said chamber, said slabs having reinforcing ribs extending longitudinally thereof and integral therewith, the juncture between adjacent refractory slabs being sealed against passage of vapor therethrough, a flat heating floor forming the bottom of said chamber, a plurality of heating tubes embedded in said floor, means for applying heat to the top of said chamber, and means for heating said tubes independently of each other; said last-mentioned heating means including a separate fuel-injector operatively connected with each of said tubes.

THOMAS R. JANES.